(12) United States Patent
Darling et al.

(10) Patent No.: US 6,538,973 B1
(45) Date of Patent: Mar. 25, 2003

(54) VARIABLE LENGTH SELF-RETAINING OPTICAL FIBER SPOOL

(75) Inventors: Michael J. Darling, San Jose, CA (US); Julieta M. Suba, Milpitas, CA (US); Raymond Chin, Santa Clara, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/357,779

(22) Filed: Jul. 21, 1999

Related U.S. Application Data
(60) Provisional application No. 60/112,260, filed on Dec. 15, 1998.

(51) Int. Cl.[7] .................................................. G11B 7/00
(52) U.S. Cl. ............................... 369/112.01; 369/112.27
(58) Field of Search ........................... 369/44.11, 44.14, 369/94, 112.01, 112.04, 112.21, 112.27, 34, 36, 40, 300

(56) References Cited

U.S. PATENT DOCUMENTS

| | | | | |
|---|---|---|---|---|
| 5,784,352 A | * | 7/1998 | Swanson et al. | 369/94 |
| 5,940,549 A | * | 8/1999 | Wilde et al. | 385/15 |
| 6,108,088 A | * | 8/2000 | Drake et al. | 356/372 |
| 6,298,027 B1 | * | 10/2001 | Wilde et al. | 369/112.02 |

* cited by examiner

Primary Examiner—Thang V. Tran
(74) Attorney, Agent, or Firm—Moser, Patterson & Sheridan LLP

(57) ABSTRACT

The present invention comprises a body for accommodating and optical fiber in a disk drive.

21 Claims, 3 Drawing Sheets

VARIABLE LENGTH SELF-RETAINING OPTICAL FIBER SPOOL

RELATED APPLICATIONS

The present application is related to and claims priority from U.S. application Ser. No. 09/124,812, filed Jul. 29, 1998 and Provisional Application Ser. No. 60/112,260, filed Dec. 15, 1998, which are incorporated herein by reference.

FIELD OF THE INVENTION

The present invention is related generally to use of optical fibers in optical drive and is related more specifically to accommodating the optical fibers in the optical drives.

BACKGROUND

In optical disk drives light is provided by a source laser located within the drive. The light is provided to illuminate storage media located a finite distance away from the laser. In prior art drives a great deal of effort has been devoted to providing a means for accurate delivery of the light to the storage media. One means that has been provided is optical fibers. Use of optical fibers in optical drives requires consideration that the lengthwise dimension of the optical fiber can be appreciably longer than any linear dimension available within the confines of the volumetric space of the drive.

What is needed, therefore, is a method and apparatus that addresses the limitations of the prior art.

SUMMARY OF THE INVENTION

The present invention comprises an optical disk drive, including: at least on e source of light; at least one storage medium; a body; and at least one optical fiber, wherein the at least one optical fiber is disposed between the at least one source of light and the at least one storage medium, and wherein the at least one optical fiber is disposed around the body.

The at least one optical fiber may be disposed around the body in at least one loop.

The at least one optical fiber may disposed around the body in a plurality of loops.

The at least one optical fiber may comprise a single mode polarization maintaining optical fiber.

The at least one optical fiber may comprise a low-birefringence optical fiber.

The at least one optical fiber may comprise a plurality of optical fibers, and wherein the plurality of optical fibers are disposed along respective generally parallel planes.

The at least one loop of optical fiber may be in operative contact with the body.

The body may comprise an elongated housing.

The optical fiber may comprise a length of 20 cm.

The present invention may comprise a body for accommodating an optical fiber in a disk drive, including: a housing, wherein the housing is disposed within a loop of the optical fiber.

The optical fiber may comprise a polarization maintaining optical fiber.

The optical fiber may comprise a low birefringence optical fiber.

The optical fiber may comprise a length of 20 cm.

DETAILED DESCRIPTION OF THE INVENTION

Figure 1:
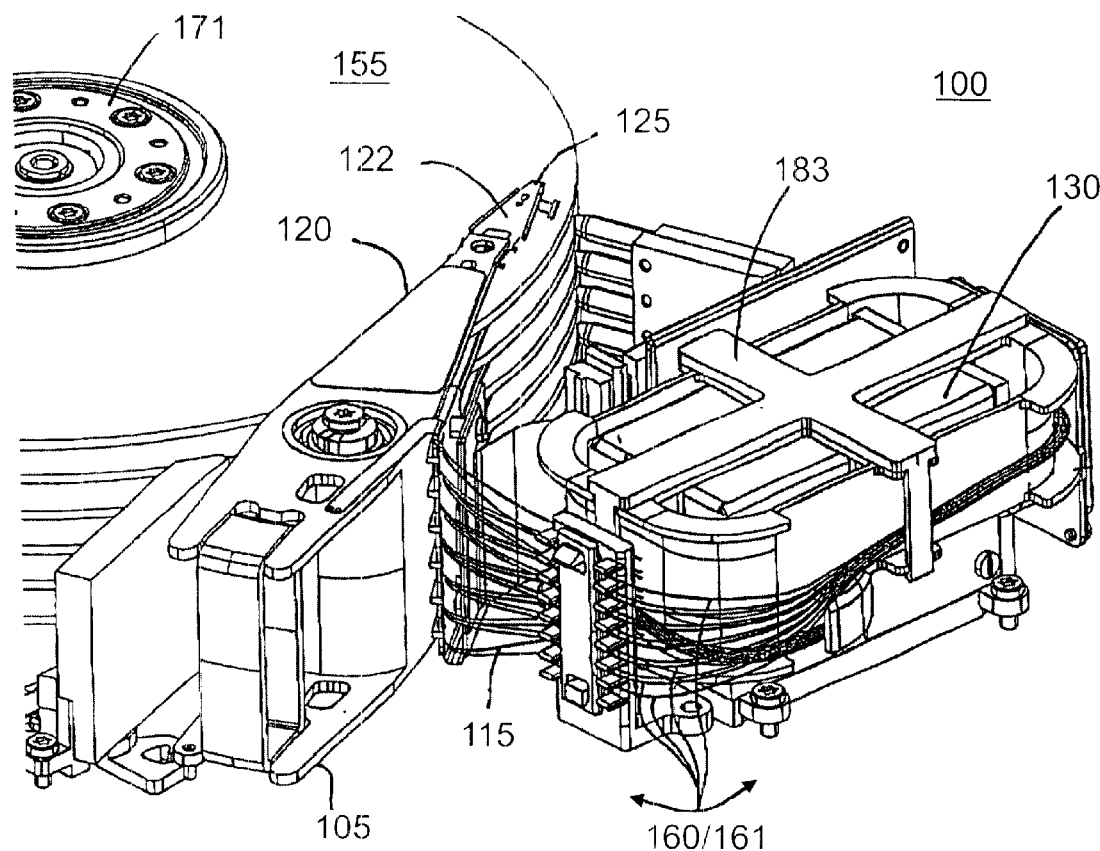
In FIG. 1 is a perspective view of a multi-disk optical drive of the present invention.

Referring in detail to the drawings wherein similar parts are identified by like reference numbers, there is seen in FIG. 1 a perspective view of a multi-disk optical drive 100. In this view it is seen that a head assembly 105 may comprise individual optical heads 125, each of which is coupled to individual arms 120 through respective suspensions 122. In one embodiment, the optical heads 125 may comprise flying optical heads. Flying optical heads are understood to comprise air bearing surfaces that interact to aerodynamically maintain the optical heads 125 a distance above respective rotating disks 155. In other embodiments, the optical heads 125 may comprise magneto-optical heads. The rotating disks 155 are rotated at a high speed, for example 10,000 RPM, by a high speed spindle motor assembly 171. FIG. 1 further illustrates a group of individual optical fibers 115, which are all coupled to an optical switch 130 at one end and to individual ones of the optical heads 125 at an opposite end. The optical switch 130 selectively directs light 160/161 between a laser source and a particular one of the individual optical fibers 115. The optical fibers 115 direct the light 160/161 between the optical switch 130 and a particular optical head 125.

Figure 2:
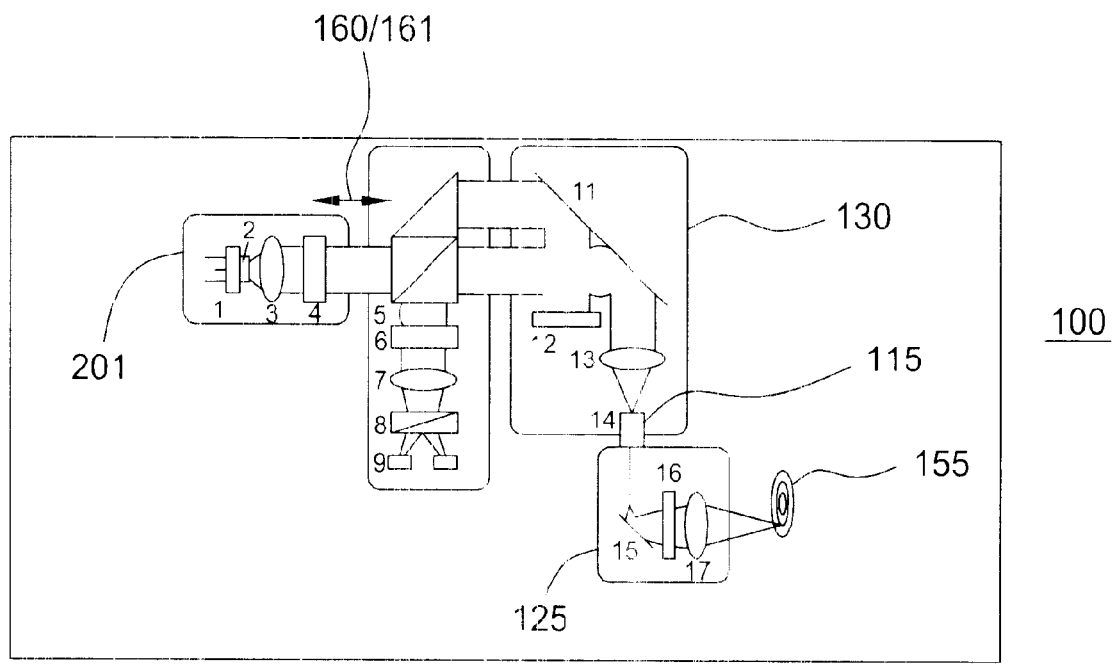
In FIG. 2 is a diagram of an optical path of the present invention.

Referring now to FIG. 2, there is seen a laser source 201 which provides the light 160/161 along an optical path of the optical drive 100. The laser source 201 is in close proximity to or part of the optical switch 130. The light 160 from the laser source 201 is delivered as a collimated beam. The collimated light is directed by the optical switch 130 to a particular optical fiber 115 and by the fiber to a particular optical head 125. The particular optical head 125 directs the light 160 to a respective disk 155. The light is reflected back from the disk 155 towards the head 125, and is directed from the optical head 125 by the optical fiber 115 towards the optical switch 130. Properties of the reflected light 161 are detected using various optical detection techniques which are well known in the art for the particular optical disk technology utilized, for example, magneto-optical, optical, etc.

Referring back to FIG. 1, it is understood that the volumetric free space that is available within the drive 100 is limited. The available space is further reduced by the physical dimensions of the various components comprising the drive, including the optical switch 130, the disks 155, individual arms 120 and respective suspensions 122, and spindle motor 171. Routing and use of the optical fibers 115 within the drive 100 is limited by the size and placement of these various components. In routing the optical fiber 115, variation in the fiber length due to tolerancing during splicing needs to thus be accommodated for, including: splicing of the fibers 115 to the heads 125 and the optical switch 130, and during subsequent repair rework and re-splicing. In practice, as much as between 20 cm and one meter of optical fiber 115 per head 125 needs to be provided. While taking the above mentioned considerations into account, the optical fibers 115 should also be routed in a planar fashion with no sharp bends or sudden direction changes somewhere inside the crowded drive 100. It is to at least this end that the present invention is directed.

Figure 3:
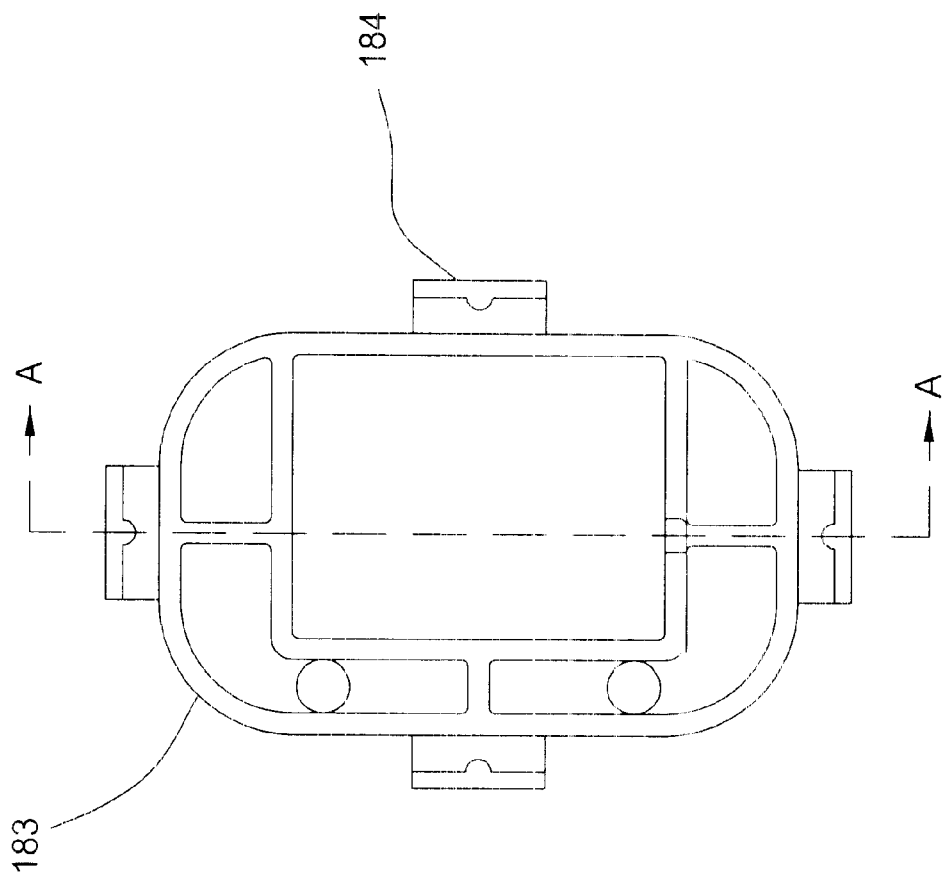
In FIG. 3 there is seen a fiber spool of the present invention.
Figure 3:
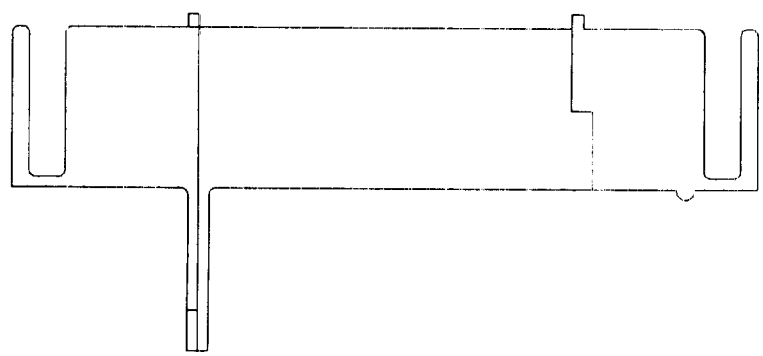

Referring now to FIG. 3 there is seen a fiber spool of the present invention. In the present invention the fiber spool 183 is shaped to fit closely around the optical switch 130 (see FIG. 1), such that the space occupied by the spool 183 is slightly more than that of the space that is already occupied by the optical switch 130. The fiber spool 183 may be an elongated or an otherwise shaped geometry such as to accommodate loops of the optical fibers 115. It is understood that the fiber spool 183 could be manufactured with many different materials and with many different processes that are well known in the art, including, for example, plastic and injection molding.

The optical spool 183 accommodates slight variations in fiber length by permitting the optical fibers 115 to be wound tightly in operative contact around the spool 183 and then by letting each optical fiber 115 relax and unravel until the slack is taken up (just like releasing drag on a fishing pole reel). The optical fibers 115 may be wound in as few as one loop or as many as a plurality of loops around the spool 183. The optical fibers 115 may be retained by retaining clips 184 which may be molded as part of the spool itself 183 or provided separately as attachments to the optical spool. The clips 184 can be used to prevent the optical fibers 115 from slipping off the spool 183 once the winding tension is released from the fibers. Larger variations in length of the optical fibers 115 due to rework of the heads 125 and re-splicing can be accommodated by simply reducing the number of times a particular optical fiber 115 is wrapped around the spool 183.

The fiber spool 183 also provides the ability to route the needed long linear length of the optical fibers 115 along generally parallel planes, with no sharp bends and without taking up much extra space within the drive 100. By routing the optical fibers 115 in this manner, between the optical switch 130 and the heads 125, their identification and handling during assembly is made easier.

It is understood, that in a magneto-optical embodiment, the optical fiber 115 would preferably be of a variety that can accurately convey polarization orientations of data bits stored on the disks 155. In one magneto-optical embodiment, the optical fibers 115 may be single mode polarization maintaining optical fibers, while in another embodiment, the optical fibers 115 may be low-birefringence optical fibers.

It is also understood, that in a single optical head and single disk embodiment (not shown) the optical switch 130 would not necessarily be required. In such an embodiment, only one optical fiber 115 would be needed to direct the light between the laser source 201 and the optical head 125.

It is further understood, that in a two optical head and single disk embodiment (not shown) the optical switch 130 would also Is not necessarily be required. In such an embodiment two optical fibers 115 could be used to direct light between two laser sources 201 and their respective optical heads 125. In such an embodiment, the cost of using two laser sources may be less than the cost of using the optical switch. It is understood that these concepts can be extended to any number of disks and laser sources.

Accordingly, while the present invention has been described herein with reference to particular embodiments thereof, a latitude of modification, various changes, and substitutions are intended with the present invention, and it will be appreciated that in some instances some features of the invention will be employed without a corresponding use of other features without departure from the scope of the invention.

What is claimed is:

1. An optical disk drive, comprising:
   at least one source of light;
   at least one storage medium;
   a fiber spool; and
   at least one optical fiber, wherein said at least one optical fiber is disposed between said at least one source of light and said at least one storage medium, and wherein said at least one optical fiber is disposed without winding tension around said fiber spool.

2. The optical disk drive of claim 1, wherein said at least one optical fiber is disposed around said fiber spool in at least one loop.

3. The optical disk drive of claim 2, wherein said at least one optical fiber comprises a plurality of optical fibers, and wherein said plurality of optical fibers are disposed along respective generally parallel planes.

4. The optical disk drive of claim 2, wherein said at least one loop of optical fiber is in operative contact with said body.

5. The optical disk drive of claim 2, wherein said body comprises an elongated housing.

6. The optical disk drive of claim 2, wherein said optical fiber comprises a length of 20 cm.

7. The optical disk drive of claim 1, wherein said at least one optical fiber is disposed around said fiber spool in a plurality of loops.

8. The optical disc drive of claim 1 wherein said fiber spool comprises an elongated substantially rectangular body, having rounded corners to avoid incurring sharp bends in optical fibers while routing the fibers in a planar fashion.

9. An optical disc drive as claimed in claim 8 when the optical fiber is retained in place on the fiber spool by retaining clips.

10. An optical disc drive as claimed in claim 9 wherein the retaining clips are molded as part of the fiber spool.

11. An optical disc drive as claimed in claim 9 wherein the optical fibers are provided separately as attachments to the optical spool and are used to prevent the optical fibers from slipping off the spool once the winding tension is released from the fibers.

12. An optical disc drive as claimed in claim 1 wherein the at least one storage medium comprises a plurality of discs, each having at least one storage surface,
   a head assembly comprising individual optical heads at least one of the heads associated with each disc storage surface, the at least one optical fiber comprising a plurality of optical fibers coupled to individual ones of the optical heads at one end and coupled to an optical switch at a second end,
   the at least one source of light comprising a laser source coupled to the optical switch, the optical switch selectively directing light from the laser source to a particular one or more of the individual optical fibers,
   and the fiber spool comprising an elongated housing shaped to fit closely around the optical switch and carrying the optical fibers on an outer surface thereof.

13. An optical disc drive as claimed in claim 12 wherein the optical fibers are mounted on the fiber spool by winding the fibers tightly around inoperative contact around the spool, and then letting each of the optical fibers relax and unravel until the slack is taken up.

14. A body for accommodating an optical fiber in a disk drive, comprising: an elongated housing with rounded corners, wherein said housing is disposed within a loop of said optical fiber, the optical fiber being disposed over part of its length over the elongated housing in substantially planar fashion without winding tension.

15. The body as recited in claim 14, wherein said optical fiber comprises a polarization maintaining optical fiber.

16. The body as recited in claim 14, wherein said optical fiber comprises a low birefringence optical fiber.

17. The body as recited in claim 14, wherein said optical fiber comprises a length of 20 cm.

18. A body as claimed in claim 14 wherein the elongated housing comprises plastic.

19. An optical disk drive, comprising:

at least one source of light;

at least one storage medium a fiber spool; and at least one optical fiber, and means for routing the optical fiber between the source of light and the storage medium in a planar fashion around the fiber spool without sharp bends and winding tension.

20. The optical disk drive of claim 19, wherein the means for routing said at least one optical fiber comprises a generally rectangular fiber spool.

21. The optical disk drive of claim 20 wherein said at least one optical fiber is disposed around said fiber spool in at least one loop.

* * * * *